June 23, 1942.  W. E. PEREIRA ET AL  2,287,638

BAKING PAN

Filed Dec. 26, 1940

INVENTORS.
Willim E. Pereira.
BY Walter J. Hunter.
Murray, Sachhoff & Paddock
ATT'YS.

Patented June 23, 1942

2,287,638

UNITED STATES PATENT OFFICE 2,287,638

BAKING PAN

William E. Pereira and Walter J. Hunter, Cincinnati, Ohio

Application December 26, 1940, Serial No. 371,642

4 Claims. (Cl. 53—6)

This invention relates to improvements in baking pans.

An object of the invention is to provide a pan which will simplify the operation of removing products from the pan after they have been baked therein.

Another object of the invention is to provide a means for simultaneously disengaging the upper portions of a number of baked products from their respective pans and raising them to a position where they may be readily grasped and entirely removed from said pans.

Another object of the invention is to provide a pan which in use will substantially lessen the number of baked products damaged by removal from their baking pans.

A further object of the invention is to provide a pan in which a baked product such as a cake or the like may be provided with a layer of icing while in the pan and can thereafter be easily removed and packed for shipment, thus saving a number of steps in the baking and packing processes now deemed necessary with the use of conventional baking pans.

A still further object of the invention is to provide a simplified pan for obtaining the above advantages and also a pan which may be easily cleaned and restored to service after each successive baking operation.

Other objects will be apparent from the following specification and claims, in which:

Figure 1:
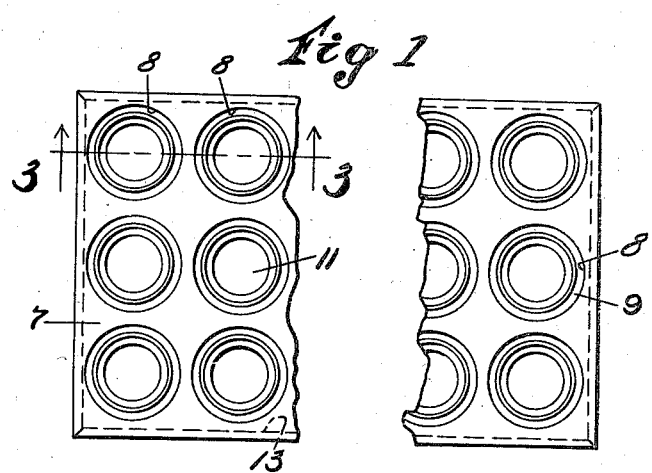
Fig. 1 is a fragmental, top plan view of our baking pan unit.
Figure 2:
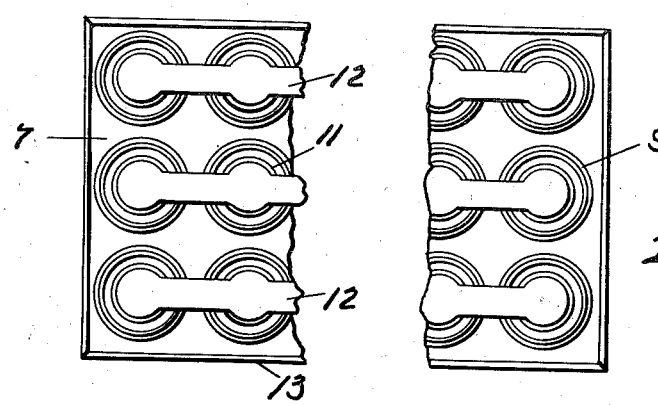
Fig 2 is a fragmental, bottom plan view of said pan unit.
Figure 3:
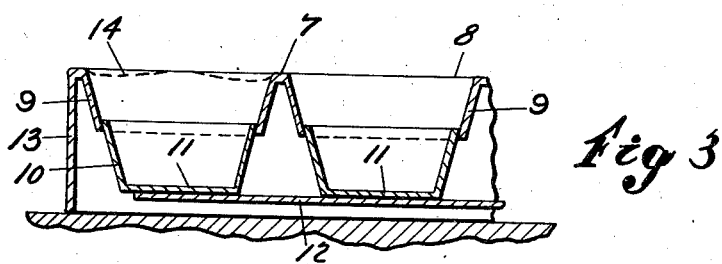
Fig. 3 is an enlarged cross-sectional view taken on line 3—3 of Fig. 1.

The pan unit comprises a rectangular plate 7 having a number of aligned rows of annular openings 8 formed therein. Each opening is provided with a plurality of telescoping members forming an open-topped receptacle in the shape of a frustum of a cone. The upper member 9 depends from the margin of the opening 8 and may be formed integral with the plate 7 to serve as a depending converging flange. The lower telescoping member 10 is cup-shaped in form and is provided with a restricted bottom 11, the dimension of the exterior portion of its top edge being greater than the interior dimension of the lower edge of the upper member 9. It will therefore be understood that the connection between the adjacent edges of the lower and upper telescoping members 9 and 10 respectively, will be a tight friction fit which will prevent the lower member from disengagement with the upper member if force is exerted downwardly on said lower member. Fig. 3 shows the adjacent edges of the members in engagement and illustrates the lower limit of motion of the member 10 relative to the member 9.

Figure 4:
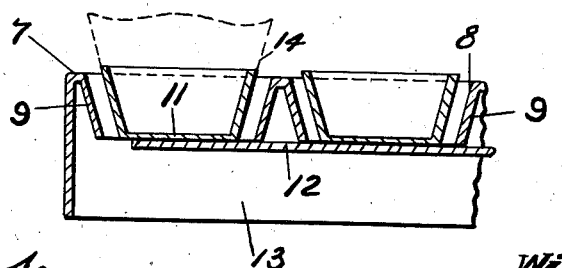
Fig. 4 is a view similar to Fig. 3 showing the pan unit in condition for removal of the product baked therein.

The bottoms of aligned rows of receptacles are connected by means of a strap 12 which also serves as a stop fixing the upper limit of motion of the members 10 with relation to the members 9, for as shown in Fig. 4, the strap 12 will contact the lower edge of the members 9 when the members 10 are moved upwardly relative to the said members 9.

The means for supporting the receptacles or pans so that the pans may depend freely from the plate 7 with the bottoms thereof in spaced relation to the supporting plane of the pan unit comprises a depending frame 13 connected at its upper edge to the marginal portions of plate 7. The vertical height of the frame is greater than the height of the pans.

In use, the individual pans are open to their operative position shown in Fig. 3 at the time the product to be baked is placed in the bottom thereof. As shown in Fig. 3, a baked product 14 is shown in a pan, said product and the products in every other pan being simultaneously disengaged from the upper portion 9 of the receptacles by moving the pans upwardly to a position indicated in Fig. 4. Said pans may be moved upwardly simultaneously by allowing the straps to rest upon a support having marginal dimensions less than those of the frame 13, so that the support will not contact said frame. In this position downward pressure may be exerted on the plate to move the lower telescoping members to their upper limits of motion. In said position, indicated in Fig. 4, it is only necessary to grasp the upper exposed portion of the baked product to remove it from the lower members 10 of the receptacle.

It is contemplated that the individual pans may have two or more telescoping members, provided the upper member is fastened to or formed integral with the supporting plate and the lower member is provided with a restricted bottom.

What is claimed is:

1. In a baking pan unit the combination of a plate having a plurality of openings formed therein, a number of telescoping members forming an open-topped receptacle, means for fastening the uppermost member of each receptacle to the plate subjacent an opening, a strap fastened to the bottoms of the receptacles, and support means on the plate for freely suspending the receptacles beneath said plate.

2. In a baking pan unit the combination of a plate having aligned rows of annular openings formed therein, a frame depending from the margin of the plate, a plurality of telescoping members forming an open-topped receptacle, means for fastening the uppermost member of each receptacle to the plate subjacent an opening, and a strap fastened to the bottoms of aligned receptacles, said frame being adapted to suspend the receptacles above the supporting surface of the pan unit.

3. In a baking pan unit the combination of a plate having aligned rows of annular openings formed therein, a converging flange depending from the marginal portion of each opening, open-topped members in the form of a frustum of an inverted cone each movable within a flange and forming with said flange a baking receptacle, said members having an exterior dimension at their open end slightly greater than the interior dimension of the lower portion of the flanges, a frame depending from the margin of the plate to suspend the receptacles above the supporting surface for the pan unit, and a strap fastened to the bottoms of aligned receptacles for fixing the upper limits of motion of said connected receptacles within their respective flanges.

4. In a baking pan unit the combination of a plate having a plurality of circular openings therein, a frame depending from the margin of the plate, a plurality of telescoping members forming an open-topped receptacle in the shape of a frustum of an inverted cone, and means for fastening the uppermost member of each receptacle to the plate subjacent an opening, said frame depending from the plate a distance greater than the height of the receptacles to suspend said receptacles above the supporting surface for the pan unit.

WILLIAM E. PEREIRA.
WALTER J. HUNTER.